Figures 1, 14, 15:
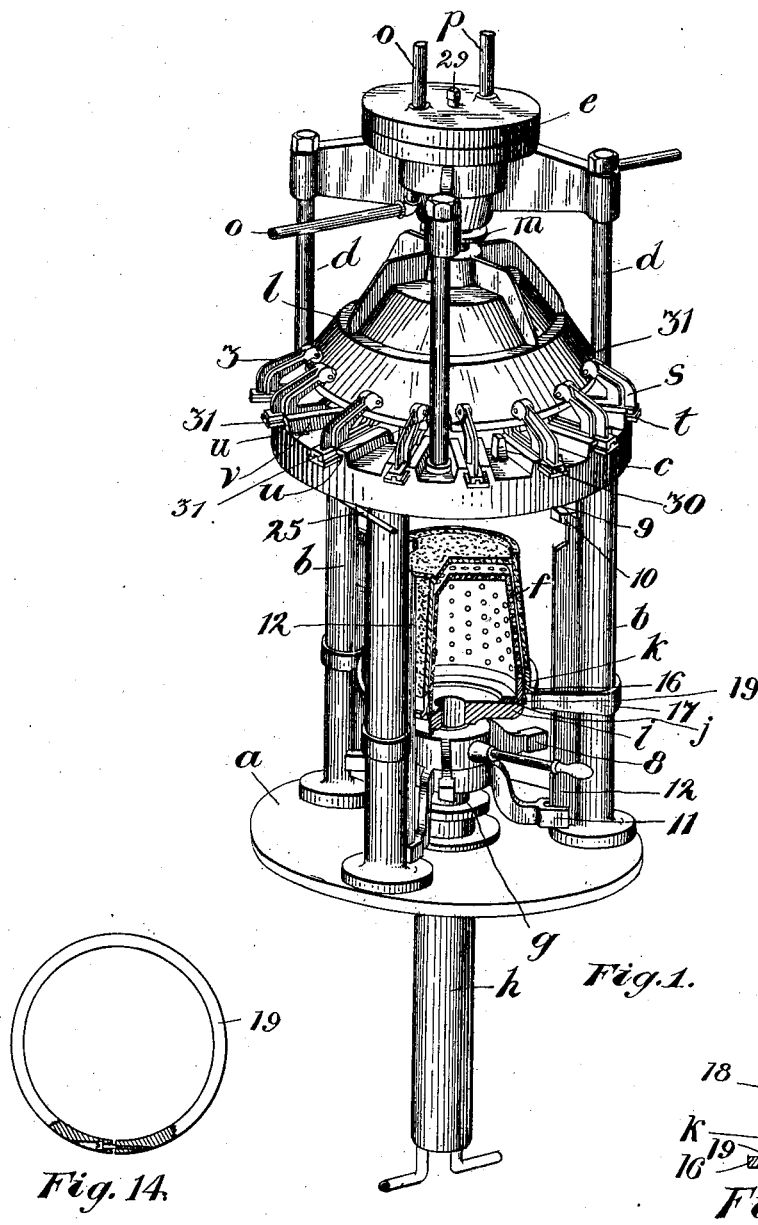

No. 762,181. PATENTED JUNE 7, 1904.
G. H. MILLEN, E. MOUSSEAU & J. RAITT.
MACHINE FOR MAKING VESSELS FROM FIBROUS PULP.
APPLICATION FILED MAR. 2, 1903.
NO MODEL. 3 SHEETS—SHEET 1.

Witnesses.
Inventors.

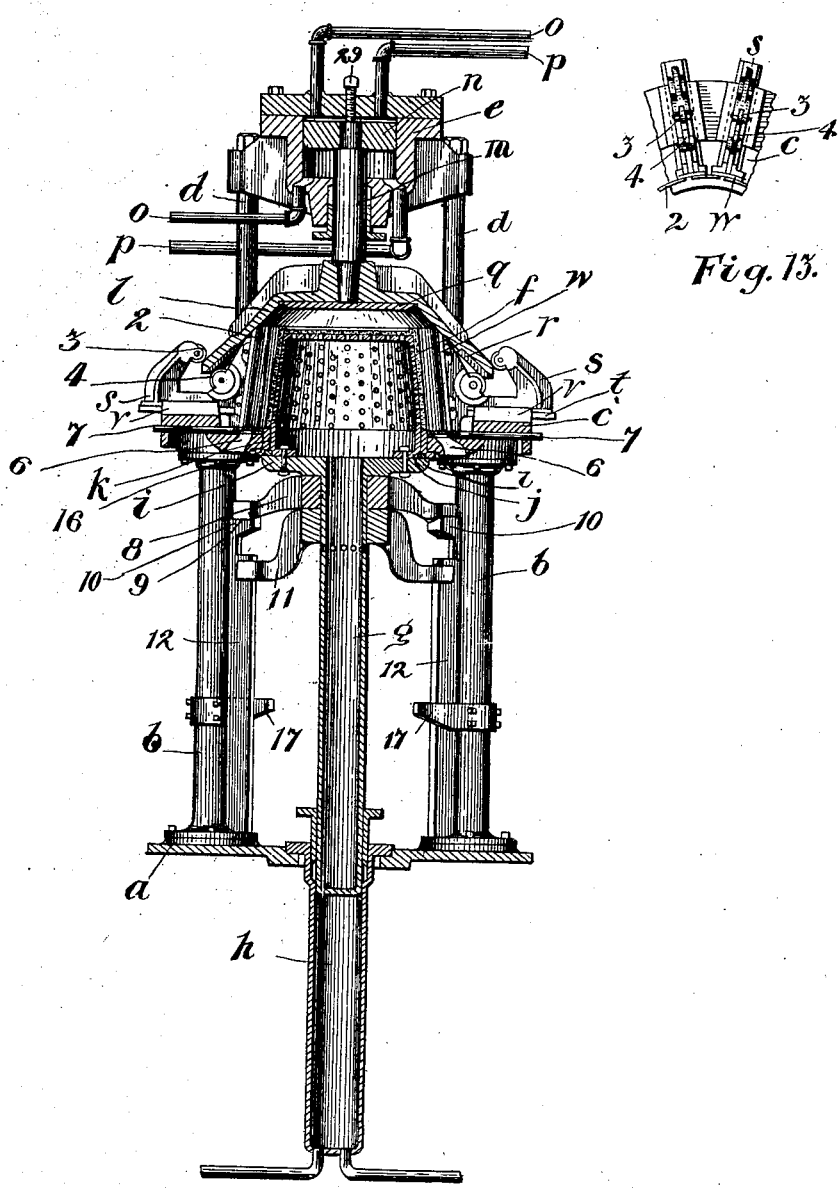

No. 762,181. PATENTED JUNE 7, 1904.
G. H. MILLEN, E. MOUSSEAU & J. RAITT.
MACHINE FOR MAKING VESSELS FROM FIBROUS PULP.
APPLICATION FILED MAR. 2, 1903.
NO MODEL. 3 SHEETS—SHEET 3.
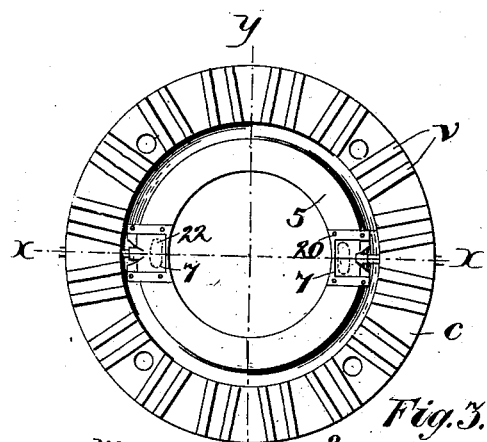
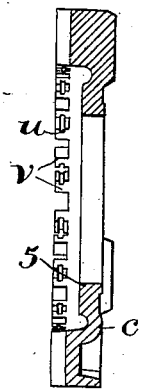
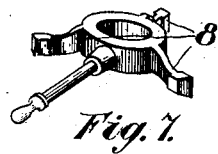
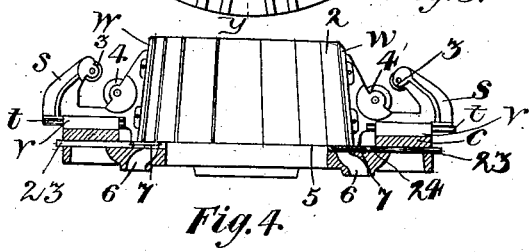
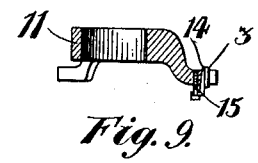
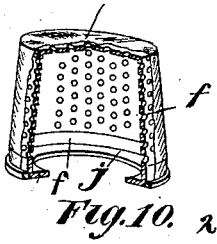
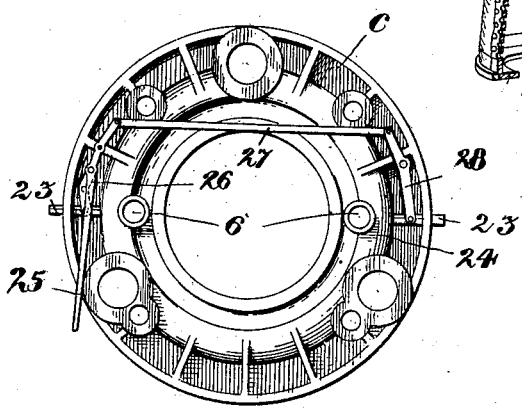
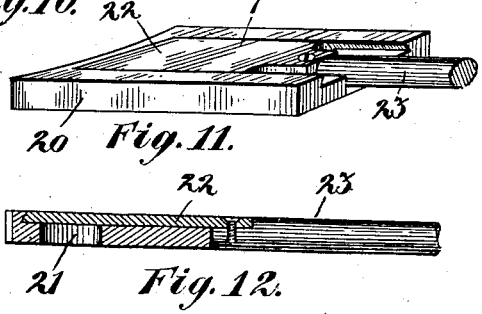
Witnesses.
F. C. Askwith
J. A. Symes.
Inventors.
G. H. Millen
E. Mousseau
J. Raitt
by Fred. B. Featherstonhaugh
atty No. 762,181. Patented June 7, 1904.

UNITED STATES PATENT OFFICE.

GEORGE HENRY MILLEN AND EDWARD MOUSSEAU, OF HULL, AND JAMES RAITT, OF OTTAWA, CANADA, ASSIGNORS OF ONE-FOURTH TO THE E. B. EDDY COMPANY, LIMITED, OF HULL, CANADA, A CORPORATION.

MACHINE FOR MAKING VESSELS FROM FIBROUS PULP.

SPECIFICATION forming part of Letters Patent No. 762,181, dated June 7, 1904.

Application filed March 2, 1903. Serial No. 145,814. (No model.)

*To all whom it may concern:*

Be it known that we, GEORGE HENRY MILLEN, superintendent, of 59 Front street, and EDWARD MOUSSEAU, millwright, of 104 Laurier avenue, in the city of Hull, in the county of Wright, Province of Quebec, and JAMES RAITT, machinist, of 148 Percy street, in the city of Ottawa, county of Carleton, Province of Ontario, Dominion of Canada, have invented certain new and useful Improvements in Machines for Making Vessels from Fibrous Pulp, of which the following is a specification.

Our invention relates to improvements in machines for pressing fibrous pulp into the form of vessels, such as pails, tubs, and the like; and the objects of our invention are to devise such a machine which shall be cheap, simple in operation, rapid in its action, and which will produce vessels of even thickness and accurately made throughout, further objects being to have a direct pressure applied to the sides and bottom of the vessels as distinguished from the sliding pressure generally used in devices of this kind; and it consists, essentially, of a suitable frame supporting the main bed-plate and central mold or shape for the vessel, radial sliders carrying overlapping segments or slats to press the sides of the vessel, and means whereby the bottom of the vessel is compressed into shape at the same rate as the sides, suitable means being also provided for advancing and retracting the various movable parts and for feeding the pulp into the machine and removing the water compressed therefrom, and the various parts being constructed and arranged in detail as hereinafter more particularly described.

Figure 1 is a general perspective view of our machine, showing a completed vessel partially in section and ready to be removed therefrom. Fig. 2 is a vertical section through the center of the machine looking toward the front, showing the position of the parts when the vessel is being formed. Fig. 3 is a plan view of the bed-plate. Fig. 4 is a section through the bed-plate on the line X X, Fig. 3, showing the sliders in position. Fig. 5 is a section through Fig. 3 on the line Y Y. Fig. 6 is a view of the under side of the bed-plate, showing the device whereby the pulp cut-offs are simultaneously opened or closed. Fig. 7 is a perspective detail of the locking device for securing the form for the inside of the pail in place when raised into its operative position. Fig. 8 is a plan of a guiding device for the piston carrying the former for the inside of the vessel. Fig. 9 is a section through the same. Fig. 10 is a detail perspective view of the former for the inside of the vessel, one part being broken away to show the interior thereof. Fig. 11 is a detail perspective view of the cut-off for the pulp. Fig. 12 is a longitudinal section through the same. Fig. 13 is a plan view of two of the slidable carriers. Fig. 14 is an enlarged view of the ring-shaped clamp for securing the cloth covering to the former. Fig. 15 is a sectional view of a portion of the central former, showing the position of the ring-shaped clamp.

In the drawings like characters of reference indicate corresponding parts in each figure.

The frame of the machine consists of a suitable base $a$ and a plurality of vertical pillars $b$, which support the bed-plate $c$.

$d$ represents pillars which are bolted to the bed-plate and support a cylinder $e$. In the center of the bed-plate $c$, which is preferably circular in form, a circular hole is formed.

$f$ is a former for the inside of the vessel which is to be made. This former is perforated in order to allow the water pressed out of the pulp to escape through its interior, whence it flows into the piston $g$, from which it is permitted to escape by suitable outlet-holes.

$h$ is a cylinder into which the end of the piston $g$ extends. Inlet and outlet pipes are provided in the bottom of this cylinder, whereby water, steam, or other liquid matter may be admitted and discharged for raising or lowering the piston $g$. This piston is provided at its upper extremity with a flange $i$, which is bolted to a flange $j$ at the bottom of the former $f$. When the piston $g$ is raised, it will be seen that the former $f$ will be raised from the position shown in Fig. 1 through the central hole in the bed-plate into the position shown in Fig. 2. A flanged ring $k$ is provided around the lower portion of the former $f$, the outside diameter of this ring being just sufficient to allow it to fit loosely in the hole in the bed-plate. The upper edge of this ring is beveled or curved, as shown in the sectional view, Fig. 2, and is intended to shape the edge of the vessel which is to be formed.

$l$ is a bell which is substantially in the shape of a frustum of a cone. This bell is designed to be raised and lowered by the piston-rod $m$, to which is attached the piston $n$, which is raised or lowered in the cylinder $e$ by the admission of a source of pressure through the inlets $o$, the exhaust being allowed to escape through the outlets $p$. The upper portion of the inside of the bell $l$ is provided with a die $q$, which is intended to form the bottom of the vessel and is preferably shaped with an annular groove at its outer edge to form a corresponding projecting ring around the under side of the vessel. The slope of the inside of the bell is preferably made at an angle of forty-five degrees for reasons to be hereinafter explained. The outside of the bell has strengthening-webs formed thereon. The lower portion of the inside is provided with a ring-shaped wear-plate $r$, whose slope is also forty-five degrees, this wear-plate being made of steel or other hard material and suitably secured to the bell.

$s$ represents sliders which are provided with laterally-extending tongues $t$, designed to slide in radially-arranged grooves $u$, formed in projections $v$, which are integral with the bed-plate and located around the circumference thereof and on the upper side.

$w$ represents curved plates to which the overlapping segmental staves or slats 2 are suitably secured. The plates $w$ are securely fastened by suitable means to the forward portion of the sliders $s$. The sliders $s$ are provided with upper and lower rollers 3 and 4, respectively, between which the lower edge of the cone-shaped bell extends, and it will thus be seen that when the bell is lowered the wear-plate $r$, coming in contact with the rollers 4, will force the sliders radially inward, thereby causing the staves or slats 2 to overlap the adjacent plate more and more, thus gradually decreasing the space between the staves and the central former $f$ till the edges of the staves come in contact.

It may here be mentioned that the staves 2 extend upwardly at an inward slant from the plane face 5 of the bed-plate to the cone-shaped surface of the inside of the bell.

It will now be seen that owing to the fact that the slope of the inside of the cone and also of the surface of the wear-plate $r$ is at an angle of forty-five degrees the result will be that the rate at which the space between the staves 2 and the inside former $f$ is diminished will be exactly the same as the rate at which the space between the die $q$ and the bottom of the inside form diminishes. Consequently when pulp is admitted into the space surrounding the former $f$ through the inlets 6 6 by opening the cut-off valves 7 7 and the bell $l$ is lowered a vessel will be pressed of even thickness throughout, the liquid contained in the pulp being forced through the perforations in the central form and passing down and out through holes in the piston $g$. It is also to be noted that the staves 2 will always be in contact at their upper edge with the inside cone-shaped surface of the bell owing to the fact that the slope thereof is at an angle of forty-five degrees. The thickness of the material of the vessel when it has been pressed is such that the vessel can readily pass through the central hole in the bed-plate without touching the sides thereof.

The operation of the machine when the vessel has been formed as above mentioned is as follows: The bell is raised by admitting water or steam or the like below the piston $n$, and thus the sliders and the staves are forced out into the position shown. The locking-arms 8, which hold the inside form and the piston, &c., at the proper height by engaging the beveled upper surface 9, formed on projections 10, integral with the pillars $b$, are now turned through a suitable angle by means of a handle, and the piston $g$ is thus allowed to descend as soon as the water begins to run out of the cylinder $h$.

In descending and ascending it may here be mentioned that the piston is held in its central position by the arms 11, which have slots formed in their extremities designed to slide on the guides 12, formed integral with the pillars $b$. In Fig. 9 we have illustrated a method of taking up the wear in the slots in these arms, which consists of a wear-plate 13 with a wedge-shaped attachment 14, which is forced in or out by a screw 15, threaded into the arm.

The ring $k$, which surrounds the lower portion of the former $f$, is provided at its lower edge with an outwardly-extending flange 16. This flange is of just sufficient diameter to be engaged by stops 17, which are suitably secured to the pillars $b$. It will thus be seen that on lowering the piston $g$ the former $f$ will pass between the stops 17; but the ring $k$ will be supported thereon, and this ring will support the vessel which has just been pressed. The vessel may now be immediately removed from the machine and the piston may be caused to reascend into the position shown in Fig. 2.

It may here be mentioned that if the outer surface of the perforated former $f$ were uncovered the pulp would be forced into the perforations, and the resulting vessel when removed would be rough on the inside from the pulp which would be torn off in the perforations. To get over this difficulty, the central former is enveloped in a bag 18, of muslin or other light cloth, which is secured at its lower edge to the former by a ring-shaped clamp 19, as shown in Figs. 10, 14, and 15. This ring-clamp holds the cloth firmly in an annular recess in the central former, and the outer side of the clamp is let into a recess in the ring $k$, as shown in Figs. 2 and 15. It will be seen that this construction has a distinct advantage over machines previously used, in which though a cloth covering was used for the former it was not suitably secured thereto and was removed every time a vessel was pressed. With the present construction, however, the cloth remains attached to the central former until it is worn out, thus effecting a considerable saving of time.

The cut-off which we employ for the pulp-inlet is shown in perspective in Fig. 11 and in section in Fig. 12, and the mechanism for operating the same is shown in Fig. 6. This cut-off consists of a plate 20, which is set into the plane surface 5 of the bed-plate. This plate 20 has a hole 21, which forms when the plate is in place a continuation of the inlet 6 in the bed-plate. A knife cut-off plate 22 slides in dovetailed grooves formed in the plate 20, and this plate when forced in will close the hole 21 and when drawn out will allow the pulp to enter. A rod 23 is secured to the plate 22 and extends outwardly through the thickness of the curved portion 24 of the bed-plate. A similar cut-off and rod is provided at the other side of the machine, and the sliding plates are caused to operate simultaneously by means of the handle 25, the lever 26, which is pivoted at one end to the handle and at the other end to one of the rods 23 and is fulcrumed intermediate of its ends, the connecting-rod 27, and the lever 28.

29 is a screw which penetrates the top of the cylinder $e$ and is designed to act as a stop to check the upward motion of the bell $l$. The downward motion thereof is limited by stops 30, formed integral with the bed-plate or secured thereto and designed to engage the lower edge of the bell when it is at its extreme lowered position. The bell is prevented from turning or having any other than a vertical motion by means of the grooves 31, formed in the lower edge thereof and through which the posts $d$ extend.

It will now be seen that we have invented a machine for making vessels from fibrous pulp which will produce with great rapidity accurately-made vessels pressed hard and firm. In machines of this type used in the past one of the principal difficulties has been due to the sliding pressure in place of the direct pressure on the surface of the vessel. It was usual in such machines to have a central former slide into an outside form of conical shape, so that the gradually-reducing diameter would press the pulp into the desired form; but in our invention it will be seen that the central form is stationary, and the staves which are to press the walls and the die which is to press the bottom of the vessel are moved at an even rate of speed and in a direction substantially normal to the surface of the vessel.

It is to be understood that considerable variations may be made in the form of the machine in which our improvements are used. For example, it might be found desirable under certain circumstances to have the central form absolutely stationary and to raise the cone-shaped bell sufficiently high to allow the finished vessel to be removed from the central form. Other changes in the details of construction of certain parts—such as the radial sliders, the locking device 8, the guides for keeping the central piston in alinement, and the like—may be made; but all such changes would come within the scope of mechanical skill and might therefore be made without departing from the spirit of our invention.

What we claim as our invention is—

1. In a machine of the class described the combination with the inside former, of an outside former, having the portion to form the bottom of the vessel arranged to move vertically directly toward and from the closed end of the inside former and the portion to form the exterior of the upright wall of the vessel arranged to move horizontally directly toward and from the upright wall of the inside former, and means for holding the inside former stationary during compression, as and for the purpose specified.

2. In a machine of the class described the combination with an inside former of an outside former having the portion to form the bottom of the vessel arranged to move vertically directly toward and from the closed end of the inside former and the portion to form the exterior of the upright wall of the vessel arranged to move horizontally directly toward and from the upright wall of the inside former, and means for holding the inside former stationary during compression, and means for contracting and expanding the outside former around the inside former as and for the purpose specified.

3. In a machine of the class described the combination with the inside former of an outside former having the portion to form the bottom of the vessel arranged to move vertically directly toward and from the closed end of the inside former and the portion to form the exterior of the upright wall of the vessel arranged to move directly toward and from the upright wall of the inside former at the same rate horizontally as the portion to form the bottom of the vessel, moves vertically toward and from the closed end of the inside former, and means for holding the inside former stationary during compression, as and for the purpose specified.

4. In a machine of the class described, the combination with the inside former, of an outside former including in its construction a die to form the bottom of the vessel arranged to move vertically directly toward and from the closed end of the inside former and means to form the exterior of the upright wall of the vessel, arranged to move directly toward and from the upright wall of the inside former, the bell secured to and movable with the die for the bottom of the vessel, the inside surface thereof adapted to complete the closure of the pulp-space during compression and means operated by the bell for contracting and expanding the outside former around the inside former.

5. The combination with a central former or inside shaper for the vessel of an outside former for the walls of the vessel comprising a plurality of overlapping sections secured to carriers arranged around said central shaper, a stationary table upon which said carriers are slidably supported, radial guides on the table for the carriers, a cone-shaped bell with whose inner inclined surface the upper edges of the sections are in contact, means whereby said cone-shaped bell in descending will cause the radial carriers to converge simultaneously therewith as and for the purpose specified.

6. The combination with a central former or inside shaper, for the vessel of an outside former comprising a plurality of overlapping sections secured to radially-slidable carriers arranged around said central former and a vertically-movable die for the closed end of the vessel, a cone-shaped bell having an inside and outside slope of forty-five degrees, the upper edges of the sections being in contact with the inner inclined surface thereof, means for raising and lowering the cone-shaped bell, means whereby said cone-shaped bell in ascending or descending will cause the carriers to diverge or converge at a speed in the radial direction equal to the speed of the cone in the vertical direction as and for the purpose specified.

7. In a machine of the class described the combination with the platform or bed-plate having a central hole, of a central former for the inside of the vessel and means for raising and lowering the same, a die or compressor for the outside of the closed end of the vessel and means for raising and lowering the same, a former for the outside of the upright walls of the vessel and means movable with said former or die for contracting or expanding the outside former around the inside former simultaneously with the lowering and raising of the compressor for the closed end of the vessel, and means for holding the inside former stationary during compression as and for the purpose specified.

8. In a section for a compressor or former for the outside of the upright wall of the vessel, the combination with a carrier with laterally-extending tongues adapted to slide in suitable grooves, a pair of rollers on the carrier adapted to be operated by a cam to advance or retract the carrier, a plate secured to the forward portion of the carrier and a flexible slat or stave secured by one of its edges near one of the sides of the plate so as to extend beyond the edge of the plate as and for the purpose specified.

9. In a device of the class described the combination with the bed-plate having grooves arranged radially around its outer edge, and the central form or inside shape for the vessel located centrally with respect thereto, of a plurality of overlapping slats or staves, radially-slidable carriers, to which said slats or staves are secured, said slidable carriers being mounted on guides extending into said grooves in the bed-plate, a pair of rollers mounted on each of said carriers, a cone-shaped bell having an inside and outside slope of forty-five degrees, the lower edge of said bell extending between said rollers and the upper edges of the said slats being in contact with the inner surface of the bell, means for raising and lowering the bell, whereby the slidable carriers are forced to diverge or converge at a rate of speed in the radial direction equal to the vertical speed of the bell as and for the purpose specified.

10. In a locking device for securing the central shaper in place when raised the combination with the supporting-posts for the bed-plate and the piston for raising and lowering the central shaper of a plurality of laterally-extending arms rotatably secured to the piston, and having beveled ends formed thereon correspondingly beveled projections formed on or secured to the posts and means for rotating the arms thereby causing them to engage the said beveled projections as and for the purpose specified.

11. In a device of the class described the combination with the bed-plate having inlet-openings therethrough for admitting pulp, of guides secured in the bed-plate at each side of the said inlets their upper surface being flush with the face of the bed-plate, sliding knife cut-offs adapted to slide in said guides and means whereby said knife cut-offs are simultaneously opened or closed as and for the purpose specified.

12. In a device of the class described the combination with the bed-plate having a pair of pulp-inlet openings therethrough arranged diametrically opposite each other, of knife cut-offs designed to close or open said inlets, rods secured to said cut-offs and extending outwardly through the web of the bed-plate, a connecting-rod, a lever pivoted intermediate of its ends to the bed-plate and pivotally connected at its ends to said connecting-rod and to the rod secured to one of said cut-offs, a handle pivotally secured to the other end of said connecting-rod and fulcrumed to the bed-plate, and a lever pivotally connected to said handle at one end and to the rod secured to the other cut-off at its opposite end and pivotally secured intermediate of its ends to the bed-plate as and for the purpose specified.

13. The combination with the bed-plate having the pulp-inlet openings therethrough, of a plate let into the bed-plate said plate having a dovetailed groove formed therein, and having its surface flush with the face of the bed-plate, a sliding cut-off arranged to slide in said dovetailed groove and means for advancing and retracting the same as and for the purpose specified.

14. In a device of the class described the combination with the central former and the flanged ring, said central former and flanged ring having annular grooves formed therein at their adjacent lower edges, of a cloth covering for the central former, a ring-shaped clamp adapted to surround the bottom of the central former and clamp the cloth in position in the recess in the central former, the outer portion of said ring-shaped clamp extending into the annular groove in the flanged ring as and for the purpose specified.

15. In a clamp for securing the cloth covering to the inside former in a machine of the class described the combination with a split ring, of a screw for drawing the ends of the ring together, said spring being countersunk into the metal of the ring so as not to project at any point as and for the purpose specified.

16. In a device of the class described the combination with the stationary bed-plate having a central hole, of an inside former or shaper for a vessel, a piston carrying the same, a cylinder to raise and lower the piston, means for locking the inside former or shaper in the operative position, an outside former comprising a plurality of overlapping slats or staves for the outside walls of the vessel, radially-slidable carriers to which said staves are secured, a vertically-movable die for the bottom of the vessel secured in a cone-frustum-shaped bell, a piston-rod secured to the bell, a second cylinder, and a piston to raise and lower the bell, said bell being adapted to complete the closure of the pulp-space during compression and to act as a cam on the slidable carriers to contract them and the slats carried thereby around the inside former at the same time as the die for the bottom of the vessel is lowered, and means for introducing pulp into the pulp-space through ports in the stationary bed-plate as and for the purpose specified.

Signed at the city of Ottawa, in the county of Carleton, Province of Ontario, this 7th day of February, 1903.

GEORGE HENRY MILLEN.
    EDWARD MOUSSEAU.
    JAMES RAITT.

Witnesses:
    EDWARD P. FETHERSTONHAUGH,
    MAY LYON.